United States Patent [19]
Brajal et al.

[11] Patent Number: 5,548,582
[45] Date of Patent: Aug. 20, 1996

[54] MULTICARRIER FREQUENCY HOPPING COMMUNICATIONS SYSTEM

[75] Inventors: Américo Brajal, Villeneuve le Roi; Antoine Chouly, Paris, both of France

[73] Assignee: U.S. Philips Corporation, New York, N.Y.

[21] Appl. No.: 361,080

[22] Filed: Dec. 21, 1994

[30] Foreign Application Priority Data

Dec. 22, 1993 [FR] France ................... 93 15460

[51] Int. Cl.⁶ ........................... H04B 1/713
[52] U.S. Cl. ............... 370/18; 370/20; 370/23; 375/202
[58] Field of Search ............... 370/19, 20, 21, 370/23, 94.1; 375/200, 202

[56] References Cited

U.S. PATENT DOCUMENTS

| | | | |
|---|---|---|---|
| 5,274,629 | 12/1993 | Helard et al. | 370/50 |
| 5,282,222 | 1/1994 | Fattouche et al. | 375/200 |
| 5,285,470 | 2/1994 | Schreiber | 375/200 |
| 5,307,376 | 4/1994 | Castelain et al. | 370/20 |
| 5,371,761 | 12/1994 | Daffara et al. | 375/200 |
| 5,406,551 | 4/1995 | Saito et al. | 370/19 |
| 5,425,050 | 6/1995 | Schreiber et al. | 375/200 |

FOREIGN PATENT DOCUMENTS

| | | | |
|---|---|---|---|
| 5596699 | 5/1994 | European Pat. Off. | H04B 7/26 |

OTHER PUBLICATIONS

"OFDM/FM Frame Synchronization for Mobile Radio Data Communication", W. D. Warner et al, IEEE Transactions on Vehicular Technology, vol. 42, No. 3, Aug. 1993, pp. 302–313.

J. G. Proakis, "Digital Communications", Chapter 8, pp. 845–860, McGraw–Hill Book Company (1989), New York.

*Primary Examiner*—Hassan Kizou
*Assistant Examiner*—Seema S. Rao
*Attorney, Agent, or Firm*—Leroy Eason

[57] ABSTRACT

A multicarrier frequency hopping spread spectrum communications system wherein a transmitting station assigns encoded data symbols to particular ones of a predetermined series of fixed carrier frequencies, the frequency assignments being periodically mixed according to a frequency hopping code, and the encoded data symbols are combined with their assigned carrier frequencies in accordance with an inverse Fourier transform so as to multiplex the encoded data symbols by orthogonal frequency division modulation. A receiving station performs demultiplexing and de-mixing of such multiplexed signals in accordance with the inverse of the multiplexing and mixing performed at the transmitter. The system thereby provides frequency hopping operation without requiring a rapidly tunable and accurately phase controlled oscillator at each of the transmit/receive stations.

6 Claims, 6 Drawing Sheets

MULTICARRIER FREQUENCY HOPPING COMMUNICATIONS SYSTEM

BACKGROUND OF THE INVENTION

The invention relates to a multicarrier frequency hopping spread spectrum communications system comprising at least one transmitter station and at least one receiver station communicating with each other by at least one transmit channel, the system comprising, at the transmitting end, baseband transfer means for transferring data by frequency hopping spread spectrum coding and, at the receiving end, reverse transfer means for recovering the transmitted data.

The invention likewise relates to a communications system comprising a transceiving base station and a plurality of transceiving user stations. The invention also relates to a transceiving user station, specifically either a mobile station communicating radio channel, or a fixed station communicating by cable, satellite or other means. The invention also relates to a base station to receive and relay messages with a view to having mobile stations communicate with each other.

A communications system for communications between users is to satisfy various criterions, and among these criterions the criterion of confidentiality is frequently experienced. The designers of such systems have thus moved towards the use of coding for message transmission. A high performance coding system is the Code-Division Multiple Access CDMA system. This system provides the advantages of reliability, robustness to disturbance, robustness to interference or degradation and can, furthermore, readily be tailored to any number of users. The principle of the CDMA system consists of spreading the frequency spectrum. Therefore, a coding message of a first duration Ts is transformed into a message of a first duration To, so that Tc=Ts/1. The parameter one may be smaller than, equal to or greater than 1. When there are M users at a given instant, there are M messages of duration Tc. These messages are then further coded with the known technique called frequency hopping spread spectrum coding, which consists of modulating M different carriers with the M messages and switching from time to time the assignment of each carrier to each respective user to distribute the transmission errors of the channel. When 1 is greater than one the fast frequency hopping technique is obtained, and when 1 is smaller than one, the slow frequency hopping technique is obtained. When 1 is equal to one, the duration of the message to be coded is not changed.

Such a system is described, for example, in the text by J. G. PROAKIS, "Digital Communications", chapter 8, pages 845–860, published by MCGRAW-HILL Book Company (1989), New York.

A base station receives the coded messages coming from all the users, decodes them, then recodes and relays them to the receiving users. The station supervises the communications, that is to say, it allows a receiving user and him alone to decode a message destined for that user. For such a system it is necessary to use an equalizer at the receiving end, which equalizer may become complex when the number in users grows. In effect, when there are echo signals of a multi-path environment, the echo signals of the channel of one user will generally not be the same as the echo signals of the channel of another user. The real performance of such a system is thus limited. Also, it is necessary to synchronize the receiver at the start of each hopping sequence, so that the received message can be decoded, which often is a problem.

In such a system it is necessary to use a frequency generator to generate the carder assigned to each user. This generator must be able to change frequency rapidly with each frequency jump. To avoid overlap of the frequencies of two generators, it is generally necessary to provide a guard band, which is a handicap.

SUMMARY OF THE INVENTION

It is thus an object of the invention to outweigh these drawbacks and increase the transmission reliability and capacity of a spread spectrum communications system.

It is an additional object of the invention to maintain reduced complexity of the system while adding to enhanced performance.

These objects are achieved with a communications system described in the opening paragraph, in which the transfer means performs the coding in accordance with an orthogonal frequency division multiplexing and the reverse transfer means performs decoding by effecting a reverse transformation of that of the coding.

To perform the coding/decoding, the transfer means comprise means for performing an inverse Fourier transform and the reverse transfer means comprise means for performing a direct Fourier transform.

Thus, advantageously, it is no longer necessary to have a frequency generator for each station, which generator according to the prior art had to be able to change the frequency rapidly with each frequency jump. It is thus no longer necessary to take the switching time of each generator into consideration or the synchronization thereof. The phenomena of spectrum overlap between two generators no longer occur either.

To effect a mixing which changes with time, a pilot mix sequence generator is necessary, so that two users are not assigned simultaneously to the same frequency.

To achieve this, to code the frequency jumps or decode them, the transfer means or reverse transfer means respectively, comprise data mixing means or data demixing means respectively, which individually comprise:
an address generator which produces variable address sequences,
a memory which is written with the data to be mixed or demixed and which delivers, when read, mixed or demixed data respectively, the mixing and/or the demixing being realised by addressing the memory differently in the read and write modes with the aid of the variable sequence address generator.

Digital symbols may be involved coming from a digitally modulated signal. This may be represented by a state constellation in a two-dimensional representation: in-phase component/quadrature component. The system then comprises in the transmitting station means for transforming transmit messages into digitally modulated symbols and in the receiving station means for extracting the messages from the received symbols.

For each symbol Se of the constellation the sampling means can generate an arbitrary number of symbol samples. This number is a real number. Depending on the number of samples taken per symbol and the frequency with which the assignment of the mix is changed, either the fast frequency hopping technique is realised or the slow frequency hopping technique. In the case of the fast frequency hopping technique, the mixing means comprise means for packetizing various symbol samples, one packet containing a number of symbol samples higher than or equal to the number of symbols of the constellation from which they originate.

The frequency-division multiplexed symbols may preferably be used by accommodating them in a frame format as used in Orthogonal Frequency-Division Multiplexing (OFDM).

Therefore, it is no longer necessary, advantageously, to use a complex equalizer at the receiving end for equalizing the signals which have been subjected to echo signals from a multipath environment. In effect, while organizing the multiplexed signal in the form of successive frames constituted by blocks containing guard intervals, it is possible to remove all the delays caused by multiple paths.

With OFDM symbols arranged in frames there are no longer problems of synchronization at the beginning of each mixing sequence either, because all the mechanisms of synchronization are derived from those used in the orthogonal frequency-division multiplex mode. There is a much wider choice and the number of the mixing sequences is much greater too.

The multiplexing means further comprise the following to form an OFDM frame:
means for adding protection symbols,
serializer means,
means for forming frames of symbol blocks and appending blocks of special symbols.

The special symbols may be synchronization symbols, service symbols, channel estimation symbols or other symbols.

At the receiving end, the demultiplexing means then comprise in a series combination:
a sampler,
input deserializer means for the received modulated dam,
means for performing a direct Fourier transform to produce said received estimation symbols.

At the receiving end, one or various automatic gain control module(s) may be added to take signal attenuations into account. These modules may be arranged for influencing each coded message assigned to each carrier at the output of the means for performing the direct Fourier transform.

According to the invention the transmitted energy is much better frequency-divided on the channel, which renders this system more robust to selective fading. The combination of the frequency hopping spread spectrum technique with the multicarder orthogonal frequency-division multiplexing technique thus provides new performance and advantages.

In a preferred embodiment the system according to the invention comprises transceiving user stations which may be mobile, and at least one fixed base station. A base station covers what is commonly referred to as a cell, that is to say, it has a certain coverage area. Beyond this coverage area there is another base station which provides the relay when the mobile station has left the boundaries of the first cell. Advantageously, due to the invention, a cell may cover a larger area, whereas previously the enlargement of a cell area necessitated an equalizer of enhanced complexity.

Each user station comprises means for transmission to the base station and for uniquely decoding the messages having that station for their destination.

The base station comprises means for transmission to all the user stations and for receiving messages coming from all the user stations and means for supervising the communications between user stations.

These various aspects of the invention and further aspects will become apparent and be explained with respect to embodiments to be described below.

BRIEF DESCRIPTION OF THE DRAWINGS

The invention will be better understood with the aid of the accompanying drawings given by way of non-limiting examples, which represent in.

DESCRIPTION OF THE PREFERRED EMBODIMENTS

The following description relates to the general case for which the transmission between the transmitting station and the receiving station is effected via a base station. However, the invention also relates to the case where there is direct transmission without the intermediary of a base station.

Figures 9, 10:
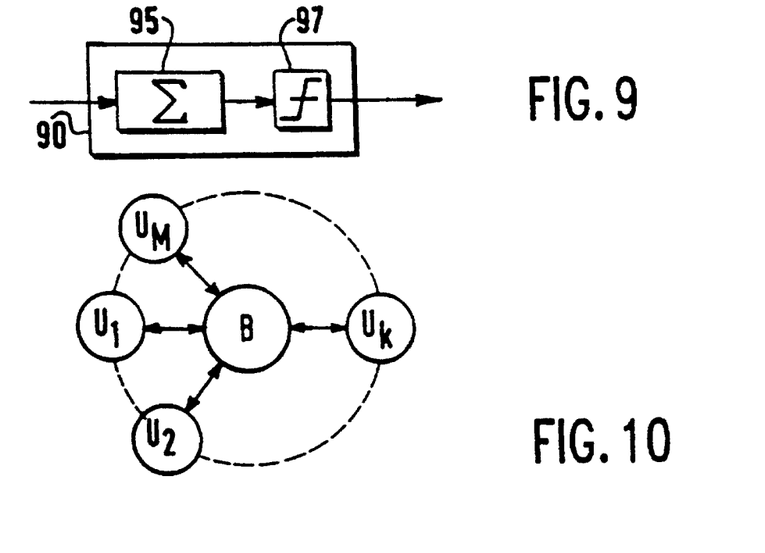
FIG. 9: an example of decision means used at the receiving end.
FIG. 10: a general circuit diagram of a multi-user communications system.

FIG. 10 symbolically represents a multi-user communications system $(U_1, U_2 \ldots U_k \ldots U_M)$, where M is the total number of users. All the users communicate via bidirectional links with a base station B. This base station serves as a relay to allow communications between any two user stations. A base station has a coverage area. As the user stations are a priori mobile stations, a user station $U_2$ (or several of them) may leave the coverage area of a base station B. In this case another base station comanages the communications. The two base stations then exchange management information to provide a communications between a user station $U_1$ (of the coverage area of B) and a user station $U_2$ (of the coverage area of the other base station).

Figure 1A:
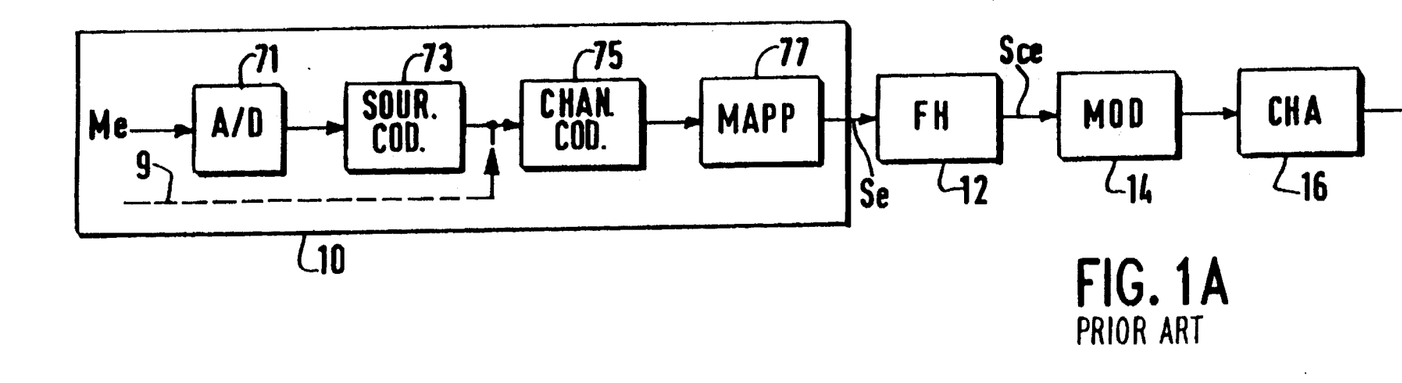
FIGS. 1A and 1B circuit diagrams of transmitting and receiving processing circuits of a user station.
Figure 1B:
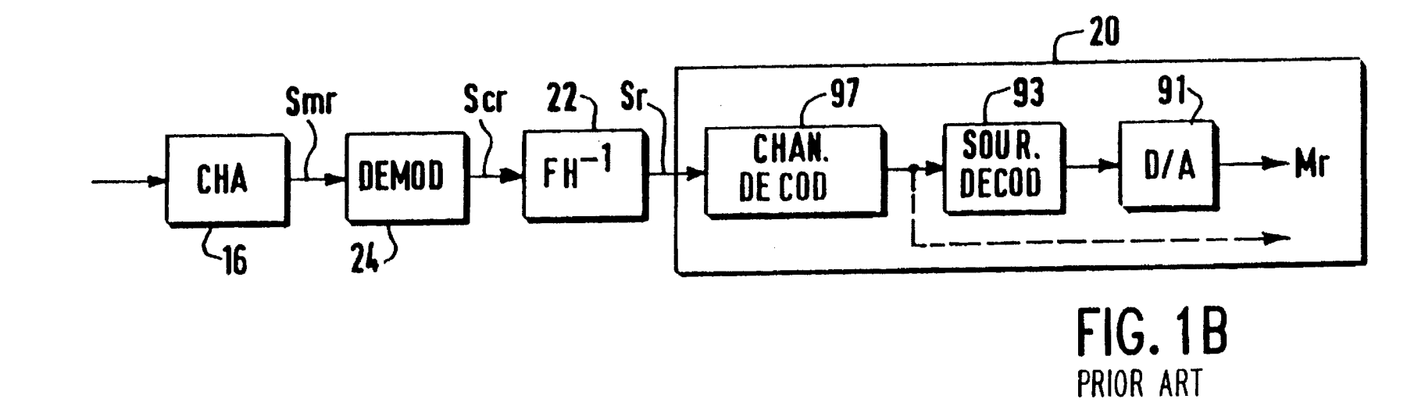

A conventional processing circuit used in an arbitrary user station is represented in FIGS. 1A and 1B. At the transmitting end (FIG. 1-A), it comprises in series combination:
coding means 10 for coding transmit messages Me and transforming them into symbols Se of a constellation of symbol values.
baseband transfer means FH 12 for transferring said symbols Se to a plurality of carders via coding by frequency hopping to deliver coded transmit signals Sce,
and radio frequency modulation means MOD 14.
The transmission is then effected by a channel CHA 16.
The coding means 10 for coding the messages Me comprise in a series combination:

analog-to-digital converting means A/D 71 which may be followed by a source coder SOUR.COD. 73;

a channel coder CHAN.COD 75;

and a mapping element MAPP 77 for mapping binary data into a constellation.

This may relate to QAM, QPSK, BPSK constellations or other constellations. The source coder 73 and the channel coder 75 can be omitted depending on the characteristics of the communications channel. Similarly, the analog-to-digital converter A/D 71 and the source coder 73 can be omitted if the message Me is in digital form. In contrast, the converter is necessary, for example, in the case of vocal messages for telephone communications from mobile user stations.

The user station also comprises as shown in FIG. 1B means for receiving data coming from other user stations via the base station. Therefore, a user station also comprises radio frequency demodulation means 24 for extracting the digital data representing the received coded symbols Scr, reverse transfer means $FH^{-1}$ 22 for extracting received symbols Sr, said means 22 performing the reverse frequency hopping operations to those performed by the FH transfer means 12, means 20 for decoding to derive received messages Mr based upon received symbols Sr by performing reverse operations to those performed at the transmitting end by the coding means 10.

The decoding means 20 comprise in a series combination channel decoding means CHAN. DECOD 97, source decoding means SOUR. DECOD 93 and digital-to-analog converting means D/A 91. These means are used to the extent that the corresponding codings have previously been performed at the transmitting end.

The demodulating means 24 perform reverse operations to those performed by modulator means 14 in the transmitter.

The invention relates, in essence, to the frequency hopping spread spectrum means 12 which, at the transmitter, operate on the transmit symbols Se, and the reverse transfer means 22 for extracting received symbols Sr.

Figure 3:
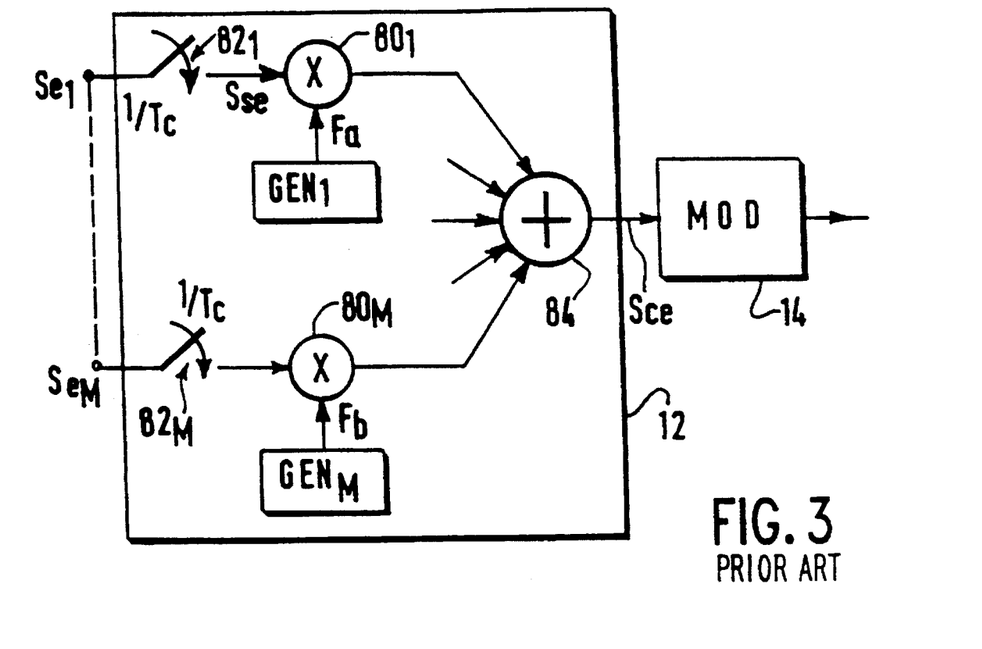
FIG. 3: a basic circuit diagram of the prior-art frequency hopping spread spectrum technique.

FIG. 3 represents a diagram of a conventional technique for spectrum spreading which consists of simultaneously modulating different carriers Fa, Fb by transmit messages while imposing frequency jumps when carriers are assigned to said messages. FIG. 3 relates to a base station. For a user station the diagram is then simplified, because it has only a single channel. Thus, the message Mel of a user is first coded (FIG. 1-A) into symbols Se 1 which are sampled at a rate 1/Tc by a sampler $82_1$ (FIG. 3). The samples thus obtained are multiplied in a multiplier 801 by a carrier having frequency Fa coming from a local generator GEN1. The data coming from the users pass through the base station. As indicated in FIG. 3 there are as many paths in the base station as there are possible users. The path assigned to the $M^{th}$ user comprises a generator $GEN_M$ which produces another carrier Fb, another multiplier $80_M$ and another sampler $82_M$. All the output signals of the multipliers are added together in an adder 84, so that multicarrier symbols Sce are produced on a single output. At a given instant a specific frequency is assigned to each path. To ensure the transmission quality, the assignment of a frequency value to a path is changed intermittently, while preferably the feature that the same frequency is not assigned to two separate path at a given instant is adhered to. The generators are thus controlled to change the carder frequency rapidly when the frequency jumps occur.

The symbols Sce are then fed to the radio frequency modulator MOD 14 to be transmitted by the channel.

According to the invention the same principle with respect to the assignment of a specific carrier to a path and the frequency jumps is adhered to. The mode of realization of that, however, is totally changed, as shown in FIG. 2.

Figure 2:
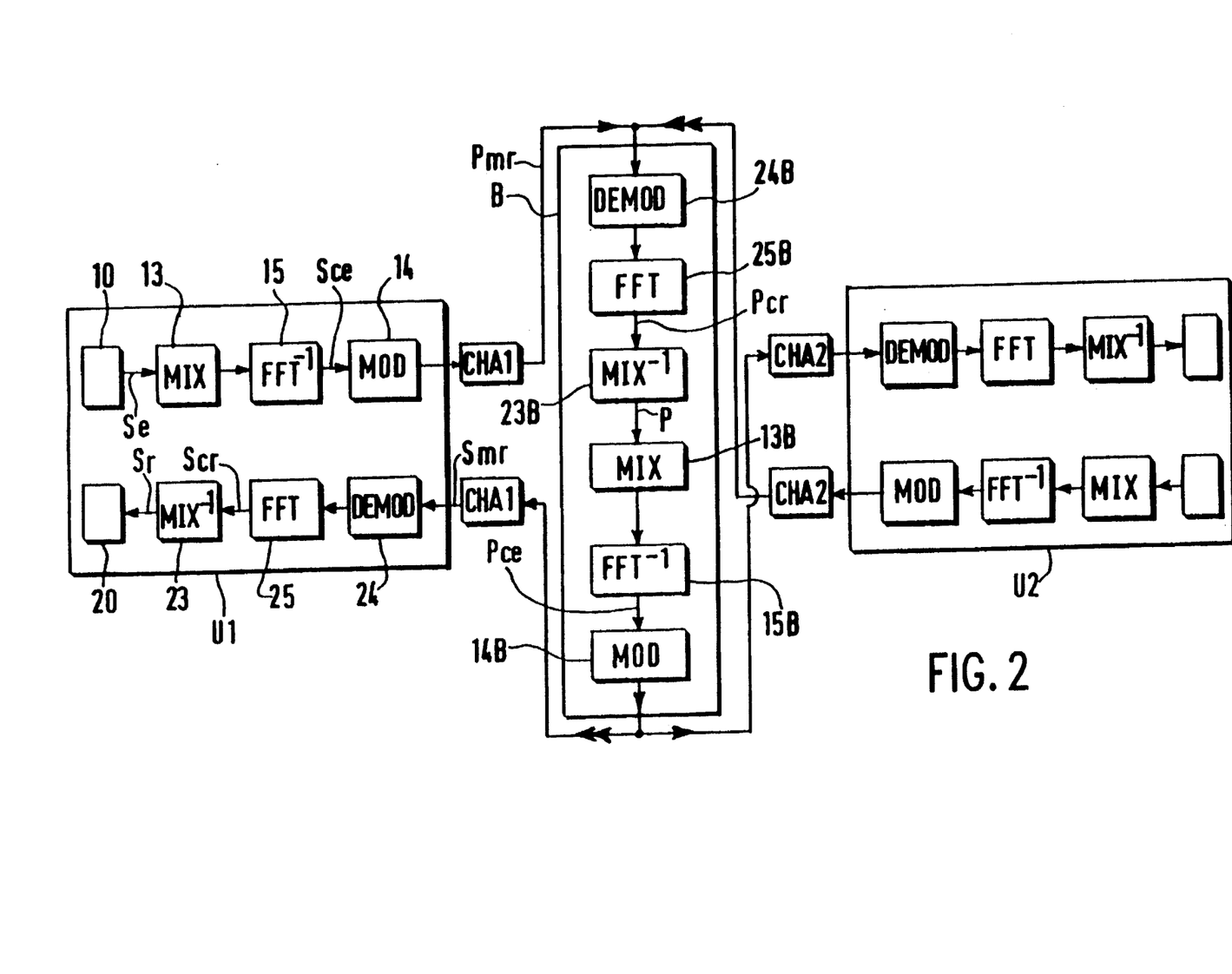
FIG. 2: a general circuit diagram of part of a communications system according to the invention.

FIG. 2 is a diagram of a communications system according to the invention, comprising a base station B and user stations, for example, two stations $U_1$ and $U_2$. Because the user stations have the same transceiving means, only station $U_1$ will be discussed in detail in the following, there being understood that a transmitting station communicates with another station which then operates as a receiving station.

According to the invention, a coding by frequency hopping spread spectrum is realised. At the receiving end, reverse operations are carried out in reverse order.

Station $U_1$ comprises coding means 10 which produce symbols Se. These symbols are then further coded in a mixer MIX 13 which is followed by a device 15 which performs an inverse Fourier transform $FFT^{-1}$ and a radio frequency modulator MOD 14 and the digital signals are transmitted as has been described hereinbefore. The mixer 13 and the inverse Fourier transform device 15 process the data in similar manner to the processing by the frequency hopping transfer 12 of FIG. 3. Nevertheless, the processed data are supplied in parallel according to the invention, whereas they are combined to a single output signal according to the known technique.

The data which may be modified by the transmit channel CHA 1, arrive at the base station B as data Pmr. They are demodulated in a demodulator 24B, then demultiplexed by a device 25B which performs a Fourier transform FFT so that received coded symbols Pcr are produced, after which a demixing $MIX^{-1}$ 23B is performed by mixer MIX 13 which is the reverse to that performed at the transmitting end, which demixing produces decoded symbols P. These symbols are, in turn, recoded at the base station by mixing means MIX 13B, then multiplexed by a device 15B which performs an inverse Fourier transform $FFT^{-1}$ and finally relayed by a radio frequency modulator 14B. The transmitted symbols arrive by a channel CHA 2 which may be different from the previous channel, at another user station $U_2$ which acts as a receiving station. Let us consider the case where the station $U_1$ operates as a receiving station for another transmitting station. It receives modulated symbols Smr from base station B, which are demodulated by the demodulator 24, then demultiplexed by a device 25 which performs a direct Fourier transform FFT and which produces coded symbols Scr which symbols are then demixed by demixing means $MIX^{-1}$ 23 performing a reverse demixing of the mix MIX performed at the transmitting end.

The base station B receives all the data coming from all the user stations. These data arrive superimposed on each other in the same frequency band at the input of the base station. This base station manages the communications. Therefore, when a station $U_1$ is to communicate with a station $U_2$, the base station B recodes the transmit message either with the mixing code of the user station for which the message is intended, or with the same mixing code as that of the transmitting station and the base station informs the receiving station of the mixing code belonging to the transmitting station, so that the receiving station can decode the messages entering the receiving station by the channel.

Figure 4:
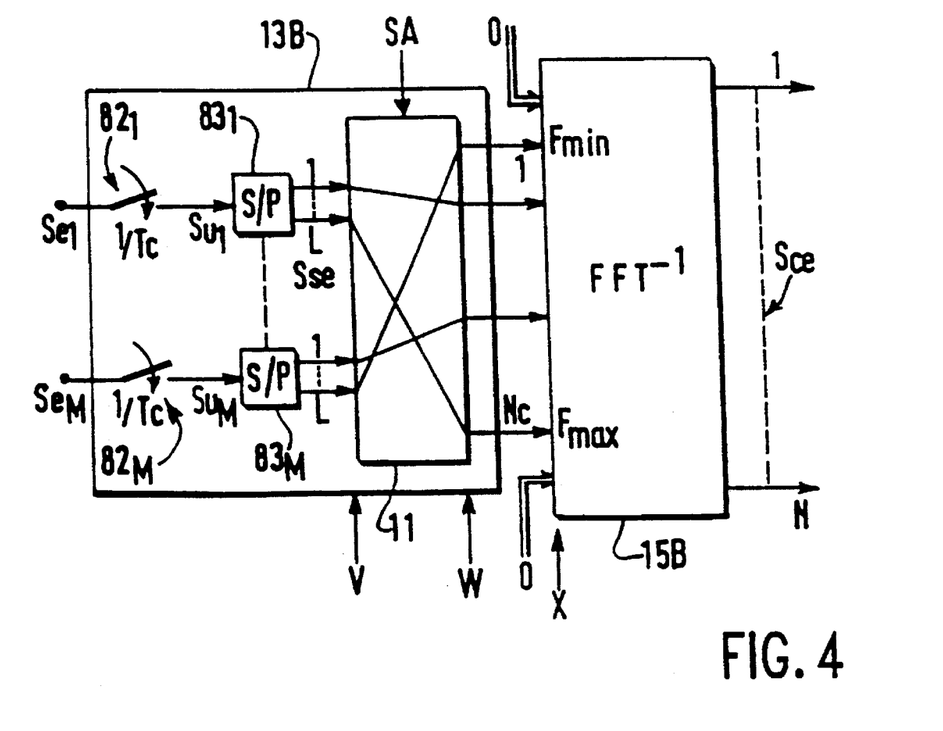
FIG. 4: a circuit diagram of an embodiment for frequency hopping spread spectrum according to the invention.

FIG. 4 shows in the case of a base station the mixing block MIX 13B and the block 15B $FFT^{-1}$. The symbols Seq-Sem coming from M users arrive at the sampling means $82_1-82_M$ which work at the rate 1/Tc and produce sampled symbols $Su_1-Su_M$. The sampled symbols are packetized (symbols Sse) in packetizing means S/P, $83_1-83_M$, wherein packetizing includes serial to parallel conversion. The packetizing means S/P $83_1$–$83_M$ are provided in so far as the sampling produces more than one sample per symbol Se. Subsequently mixing, means 11 produce a mixture of the packetized symbols Sse. At the output of mixing means 11 the sampled symbols are no longer in the same order as they had when entering. The revised order is a function of a mixing command SA which assigns to each sampled symbol a series carrier frequencies of a multicarder modulation, the assignments being the object of frequency jumps. The symbols thus mixed are then transformed into frequency-division multiplexed symbols in accordance with an orthogonal frequency division. This is effected in the multiplexing means 15B which perform an inverse Fourier transform. To perform the inverse Fourier transform, a number of data $N=2^G$, where G is a positive integer, are to be simultaneously applied to the input. When the total number of carriers $N_c$ is such that $N_c<N$, "zero" data are to be added to the inputs situated on either part of the information carrier inputs. At the output of block 15B parallel data Sce are available in a multicarrier orthogonal frequency-division mode.

Figure 5:
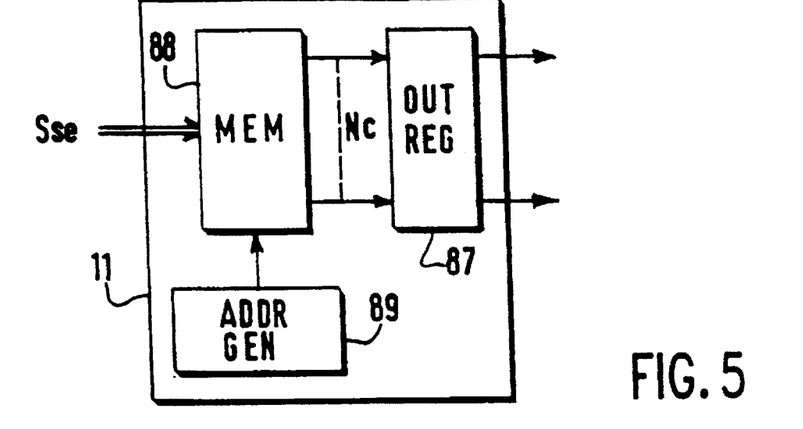
FIG. 5: an example of a circuit diagram for symbol mixing means.

FIG. 5 represents an embodiment for the mixing means 11. The symbols Sse are, for example, written in a memory MEM 88 at addresses determined by an address generator ADDR GEN 89. When reading this memory MEM, the address generator 89 produces read addresses which are different from the addresses used for writing. The mixing of the symbols indicated diagrammatically in FIG. 4 is realised in this manner. An output register 87 makes it possible to combine the symbols into groups for a common parallel output.

These symbols may be used in this form or, preferably according to the invention, they are incorporated in a format of a multicarrier modulation called OFDM. This makes it necessary to add a certain number of service signals which make it possible to enhance the reliability of the transmissions.

Figure 6:
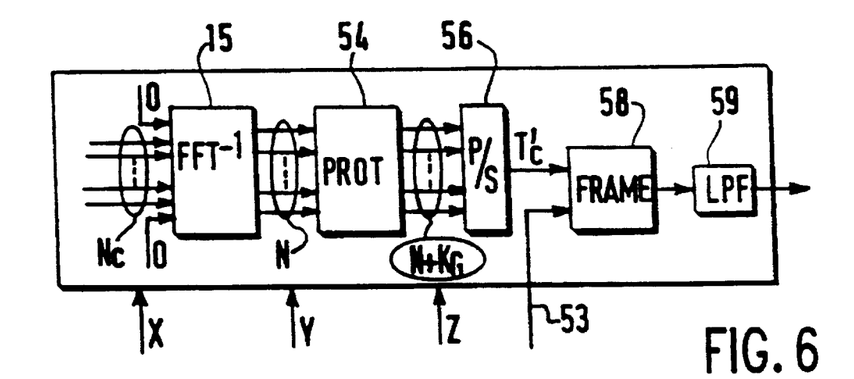
FIG. 6: a circuit diagram of an OFDM multiplexer intended to be used with a multicarrier transmission.

The mechanisms for constructing an OFDM frame are represented in the diagram shown in FIG. 6.

At a given instant the N symbols coming simultaneously from data symbol mixer means 15 form a part of an OFDM data block. A protection device PROT 54 adds data that correspond to a guard interval to this part of the data block. This consists of recopying certain data.

Figure 12:
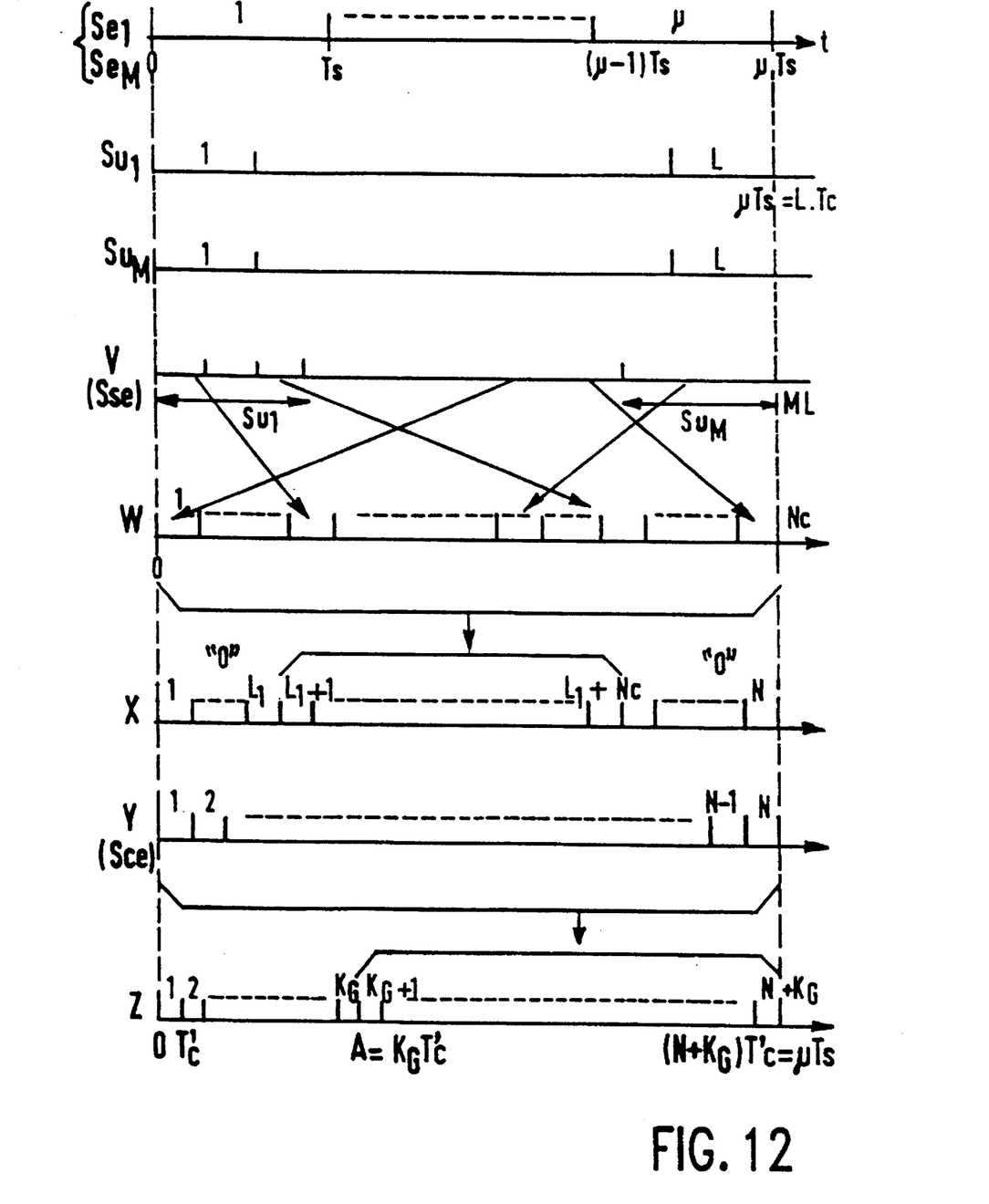
FIG. 12: a diagram of symbols distributed over a period of time $\mu Ts$.

FIG. 12 shows in detail the mechanisms used in the formation of an OFDM data block. A symbol Se is generally a complex value. The first line represents, for example, a sequence of states for a symbol $Se_1$ to be coded for the user $U_1$. A symbol $Se_1$ has a duration Ts. A sequence of various symbols, for example, μ symbols, is considered which corresponds to a duration of μ.Ts. Such a sequence $Se_1$–$Se_M$ corresponds to each user $U_1 \ldots U_M$.

After passing through the samplers $82_1$–$82_M$ (FIG. 4), these symbols Se become sampled symbols $Su_1$–$Su_M$ which, after being formed to groups in parallel, become the grouped symbols Sse (referenced V in FIG. 4). Thus μ symbols Se become L output symbols of each combining means S/P, $83_1$–$83_M$ for each duration μ.Ts and for each user U (with $L \geq \mu$). Preferably, the ratio L/μ is an integer.

The data coming from the M users are gathered to form M.L data Sse (signal V). Then, the M.L data are mixed according to the principle described with respect to FIG. 5 and thus form Nc data (signal W) where Nc is equal to the maximum number of users multiplied by L. Nevertheless, Nc can be greater than M.L. The Nc data thus form Nc symbols of an OFDM signal. There are thus Nc symbols which enter in parallel block 15 which performs an $N^{th}$-order inverse Fourier transform, so that $N=2^G>Nc$, while G is an integer. Therefore, the Nc symbols are completed by a number L1=(N-Nc)/2 of "0" data on either side of the input of block 15 (referenced X in FIG. 6). If N-Nc is odd, the beginning or end of the block obtains another symbol. If μ.L is equal to 1 (that is, one sample per initial symbol Se), a slow frequency hopping system is obtained by changing the mixing every k blocks (where k is an integer greater than or equal to 1). To permit the N symbols to leave subsequently during a period μTs, block 15 operates with a shorter duration, that is μ.Ts/N (referenced Y). The N symbols which leave block 15 are in their turn completed by $K_G$ symbols which correspond to a guard interval $\Delta=K_G .T'c$ which forms protection. The $K_G$ symbols correspond to a copy of the most recently preceding symbols. These $K_G$ symbols are appended to the N symbols to form a block of $(K_G+N)$ symbols to be transmitted (referenced Z). There too the guard block 54 operates with a still diminished duration (T'c=μTs/(N+$K_G$)) to allow of the $(K_G+N)$ symbols leaving later in series during a period that is kept equal to μTs. A serializer 56 performs the serialization of the $(K_G+N)$ symbols. The successive blocks of $(K_G+N)$ OFDM symbols are then framed in OFDM frames in a device 58 referenced FRAME. This device adds special symbols 53 (synchronization, modulation or others) which are used, among other things, for synchronizing transmission and reception or for channel estimation. A low-pass filter 59 LPF filters the signals before they are transmitted via the radio frequency modulator 14, 14B (FIG. 2).

Figure 7:
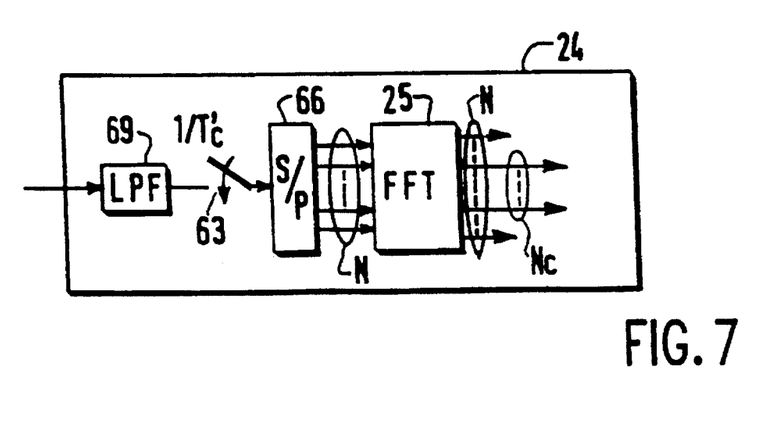
FIG. 7: a circuit diagram of an OFDM demultiplexer.

At the receiving end, the received modulated symbols Smr are demodulated in the demodulator 24 (FIG. 2) after which they enter the demultiplexing device FFT 25 which performs a reverse process to that performed at the transmitting end by performing a Fourier transform. The device 25 comprises in a series combination (FIG. 7):

a low-pass filter 69
a sampler 63 having a timing 1/T'c,
a deserializer 66 which produces N useful symbols and thus does not take the $K_G$ symbols received during the guard interval into account,
a computing device 25 for computing a direct Fourier transform which delivers a sequence of N-symbol blocks.

The ends of the N-symbol blocks are abandoned, so that only the central portion is retained comprising Nc symbols Scr. They enter the demixer $MIX^{-1}$23, (FIG. 2) to be remixed.

Figure 11:
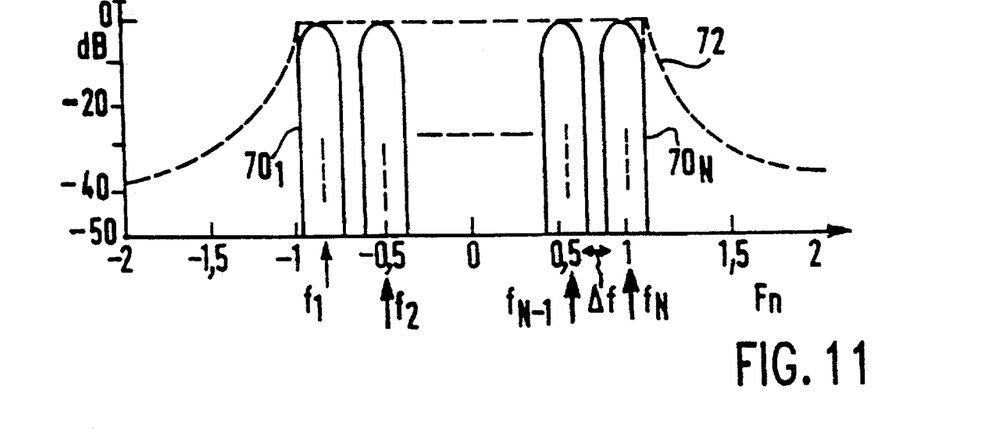
FIG. 11: two curves of the frequency response of a conventional system having spectrum spreading and of a system according to the invention.

FIG. 11 represents the spectral power density of the transmitted signal plotted against frequency. The curves $70_1$–$70_N$ correspond to a conventional spread spectrum system featured by a spectrum formed by narrow bands each centred at frequencies $f_1, f_2 \ldots f_N$ separated by guard bands Af. Curve 72 corresponds to a system according to the invention which combines the frequency hopping spread spectrum techniques with the techniques of multicarrier transmitted orthogonal frequency-division multiplexing. The horizontal scale corresponds to a baseband frequency $F_n$ normalized relative to the useful band of the signal. The vertical scale corresponds to the spectral power density expressed in decibels. It is noted that for a conventional system the spectrum $70_1$–$70_N$ has several separate narrow bands to allow a separation of the oscillators and thus a loss of bandwidth. In contrast, for the multicarrier system according to the invention the spectrum 72 is rectangular, which shows that the transmitted energy for all the carriers remains constant in the useful band of the signal. There is thus a better use of the transmit channel which makes the transmissions more reliable and reduces the complexity of the receiving circuits.

The diagram of the OFDM multiplexer represented in FIG. 6, which is a more elaborate version of the multiplexer FFT$^{-1}$ 15 of FIG. 2, is preferably used both in a user station and in a base station.

The transmit channels may be subject to fading which alters the received signals. This fading may occur in the frequency domain and/or time domain. It is thus desirable to have an automatic gain control at the receiving end. The latter may not be indispensable, however. This is indicated by way of a dotted line in FIG. 8.

Figure 8:
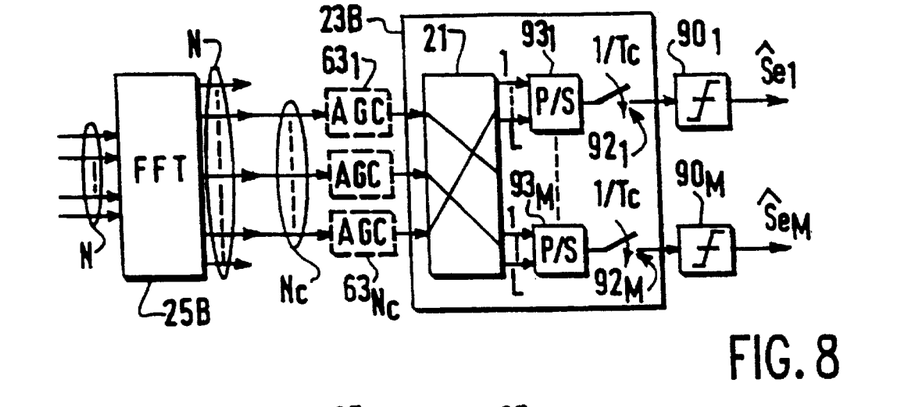
FIG. 8: a circuit diagram of a demultiplexer used for estimating received symbols in a user station with automatic gain control.

FIG. 8 shows a diagram of the receiving section of a user station with automatic gain control AGC. The Nc signals assigned to each carder preferably have device AGC $63_1$–$63_{Nc}$.

After the demixing by the demixing means 21, the M.L data leave in groups of M packets of L data. Each packet is intended for a user $U_1, \ldots U_M$. A packet of L parallel data is transformed by serializers P/S $93_1$–$93_M$ into L serial data which are sampled with the timing 1/Tc by sampling means $92_1$–$92_M$. The means $93_1$–$93_M$ for separating the samples from a packet exist in so far as the reverse operation has been performed at the transmitting end. Finally, decision means $90_1$–$90_M$ permit the estimation of the μ transmit symbols $\hat{S}e_1, \hat{S}e_M$ for each user.

A decision means $90_1$–$90_M$ may be formed, for example, by a mean value calculating means Σ94 combined in series with a threshold decision element 97 (FIG. 9).

The combination of the coding via frequency hopping spread spectrum with a multicarrier modulation by orthogonal frequency-division multiplexing provides various advantages.

It is no longer necessary to synchronize at the receiving end at the beginning of each mixing sequence as this is required if the known technique is used separately.

Due to the use of a multicarder modulation, there is much more freedom as to the choice of pseudo-random sequences.

Preferably, OFDM signals organized in frames are used. Because each user station has its own frame, the synchronization mechanisms at the receiving end are simplified. Moreover, the use of a guard interval for each data block permits of eliminating all the uncertainties which could occur both depending on propagation delays which vary with the distances transmitter/receiver and on delays owing to multiple paths. More particularly, the propagation delays are linked with the coverage area of the base station. It is noted that the existence of the guard interval makes it possible to extend this coverage area compared with the conventional techniques of spectrum spreading and this without enhancing the complexity of the hardware used. In the case of the conventional technique it would be necessary to include a complex equalizer to overcome these difficulties.

Furthermore, according to the invention the energy is equalized on the channel, which renders this system more robust to fading.

We claim:

1. A multicarrier frequency hopping spread spectrum communications system comprising at least two stations each of which includes a transmitter section and a receiver section, communication between stations being via a communications channel between the transmitter section of one station and the receiver section of another station; characterized in that:

the transmitter section of each station comprises encoding means for encoding data symbols of a signal to be transmitted, the encoding being in accordance with a constellation of code values;

mixing means coupled to said encoding means for assigning samples of the encoded data symbols to particular ones of a predetermined series of fixed carrier frequencies, the frequency assignments being periodically mixed in accordance with a frequency hopping code; and multiplexing means coupled to said mixing means for combining the samples of encoded data symbols and their assigned carrier frequencies in accordance with an inverse Fourier transform, so as to multiplex the samples of encoded data symbols by an orthogonal frequency division modulation; and the receiver section of each station comprises:

demultiplexing means for receiving multiplexed samples of encoded data symbols transmitted by the transmitter section of another station, and applying a direct Fourier transform to demodulate by reversing the orthogonal frequency division modulation performed on the samples of encoded data symbols in the transmitter section of said other station;

demixing means coupled to said demultiplexing means for combining the demodulated samples of encoded data symbols in accordance with the inverse of the frequency hopping code employed in the transmitter section of said other station, thereby recovering said samples of encoded data symbols; and decoding means coupled to said demixing means for decoding the samples of encoded data symbols produced thereby in accordance with the inverse of the constellation of code values employed in the transmitter section of said other station.

2. A communication system as claimed in 1, wherein said mixing means in the transmitter section and said demixing means in the receiver section each comprise a memory for storing the samples of encoded data symbols and an address generator for producing variable address sequences for said memory; the memory in said mixing means being written with the samples of encoded data symbols to be mixed and the memory in said demixing means being written with the samples of encoded data symbols to be demixed; mixing and demixing being produced by providing a different address sequence for writing the samples of encoded data symbols into said memory than for reading the samples of encoded data symbols therefrom, the address sequence employed determining the applicable frequency hopping code.

3. A communication system as claimed in claim 1, wherein the signal to be transmitted is a digital signal comprising a succession of data symbols.

4. A communications system as claimed in claim 3, wherein for performing said frequency hopping said mixing means further comprises means for sampling the encoding data symbols and forming the symbol samples thereby derived into data packets of the encoded data symbol samples, each packet containing a number of symbol samples which equals or exceeds the number of samples taken of each encoded data symbol.

5. A communications system as claimed in claim 1, wherein said transmitter section further comprises means coupled to said multiplexing means for assembling the multiplexed encoded data symbol samples into a series of signal frames, and said receiver section further comprises means coupled to said demultiplexing means for deriving the multiplexed encoded data symbol samples from received signal frames.

6. A communications system as claimed in claim 5, wherein said means for assembling the multiplexed encoded symbol samples into signal frames comprise means for adding protection symbols to each frame and means for serializing said frames.

* * * * *